Dec. 5, 1967 T. W. CALLAHAN ETAL 3,356,788
STRESS RELIEF CONES FOR HIGH VOLTAGE, SHIELDED CONDUCTORS
Filed Nov. 19, 1963 4 Sheets-Sheet 2
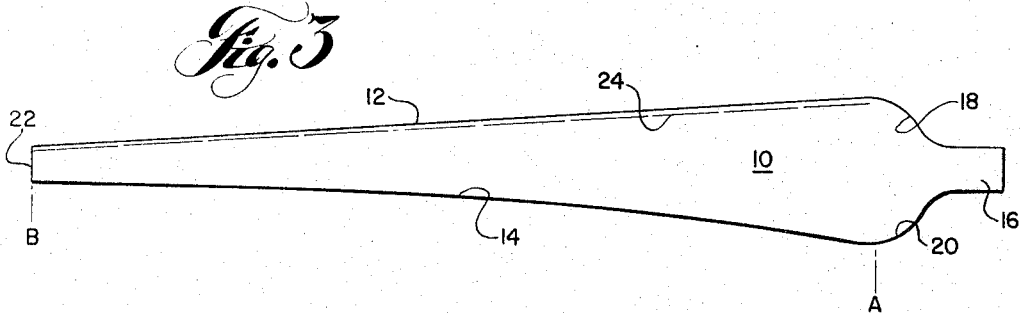
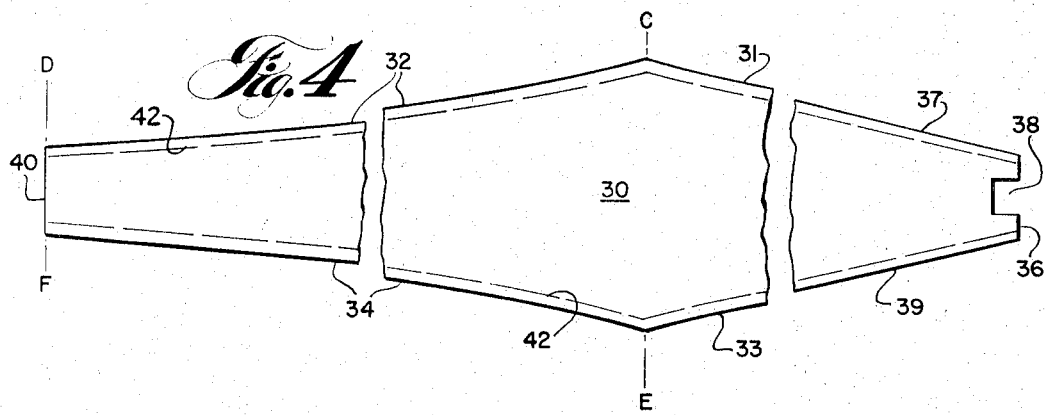
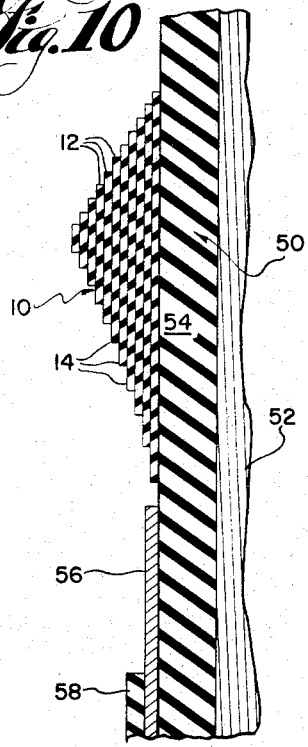
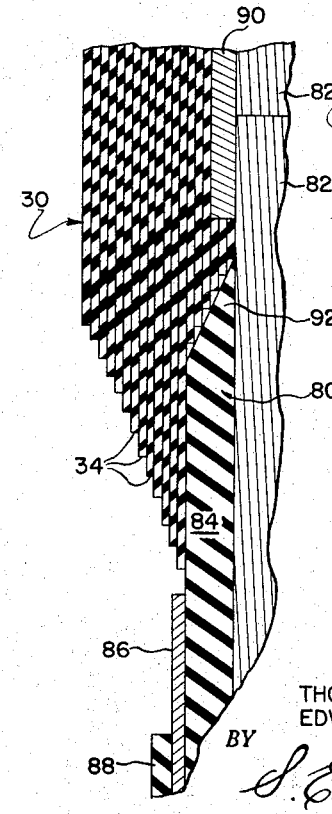
INVENTORS
THOMAS W. CALLAHAN
EDWARD K. DUFFY
BY
S. Ernest Low.
ATTORNEY Dec. 5, 1967     T. W. CALLAHAN ETAL     3,356,788
STRESS RELIEF CONES FOR HIGH VOLTAGE, SHIELDED CONDUCTORS
Filed Nov. 19, 1963     4 Sheets-Sheet 3
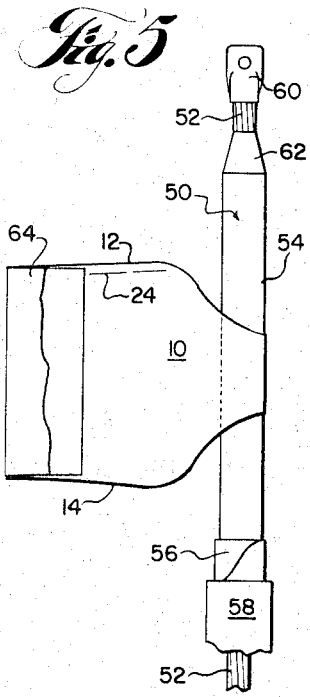
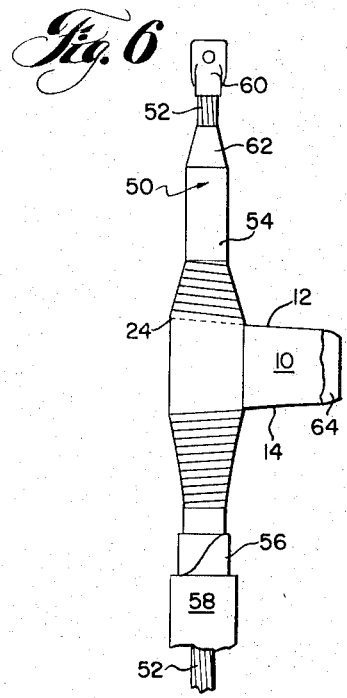
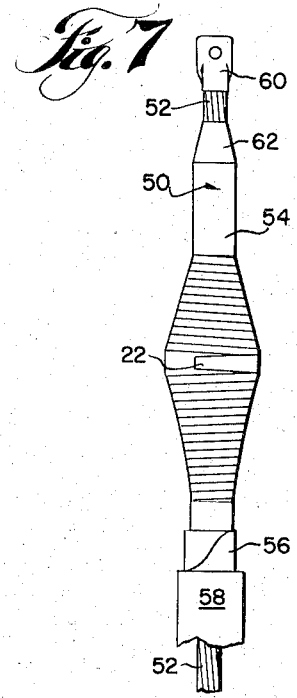
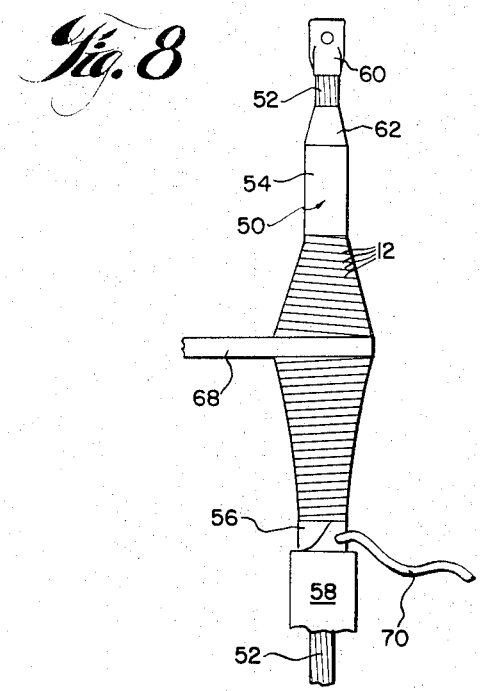
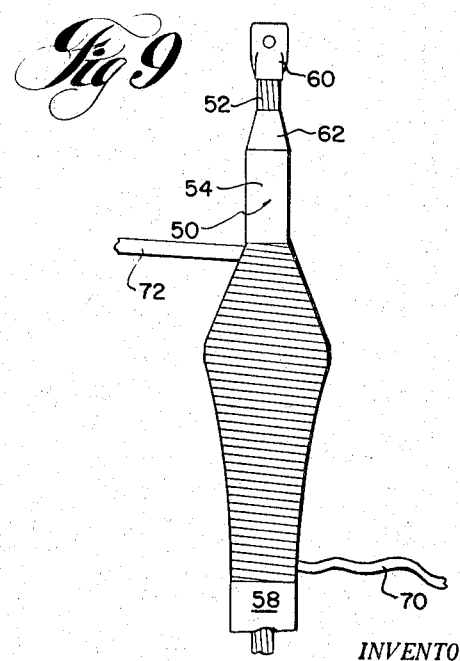
INVENTORS
THOMAS W. CALLAHAN
EDWARD K. DUFFY
BY
S. Ernest Low
ATTORNEY

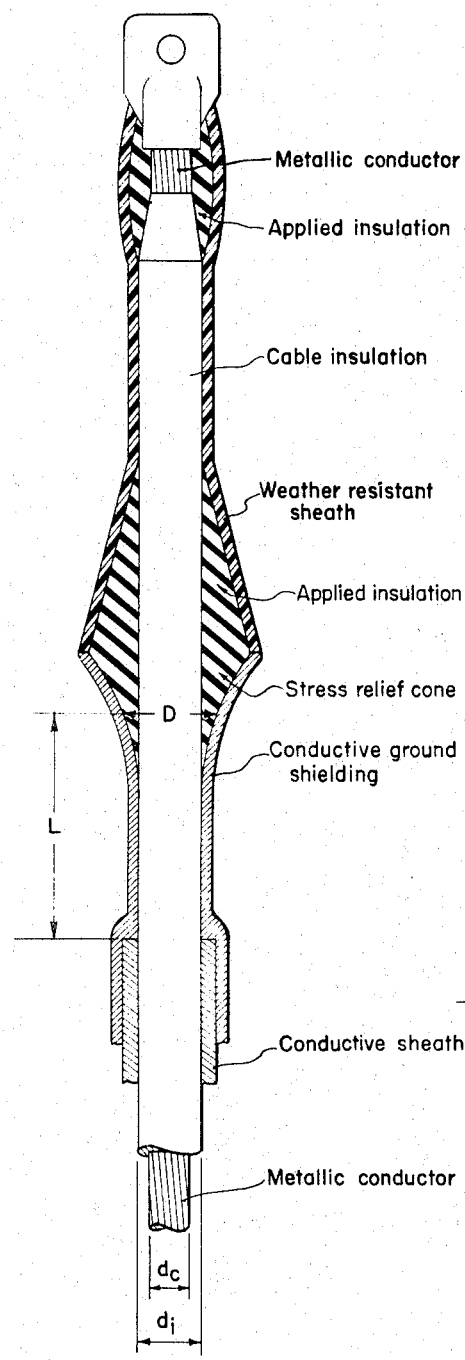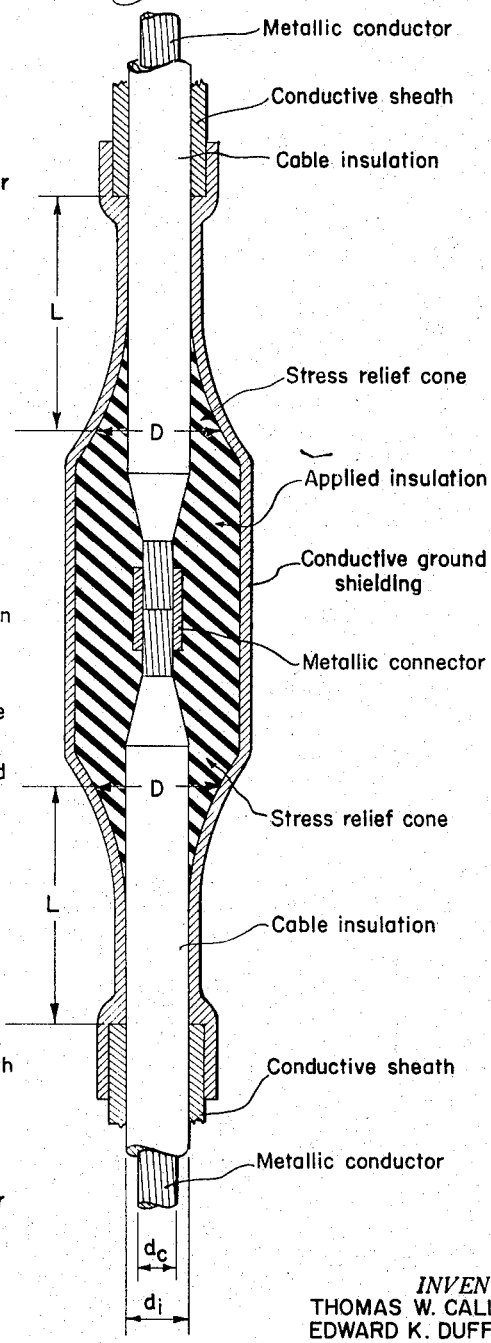

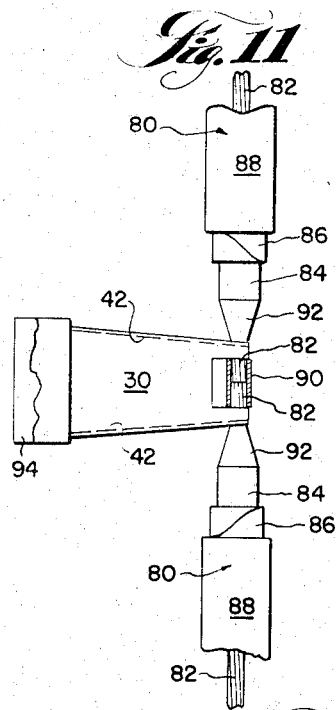
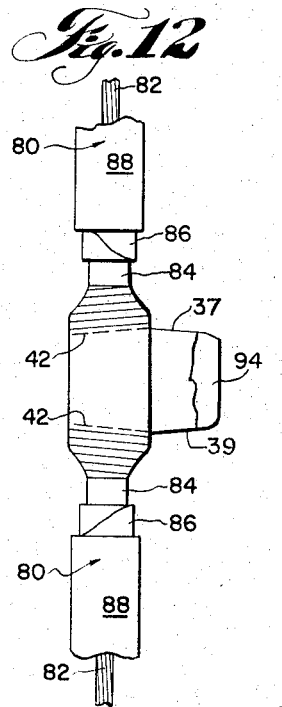
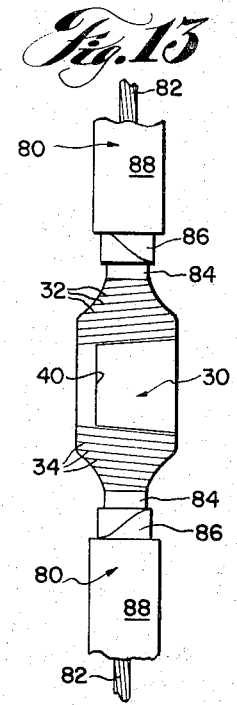
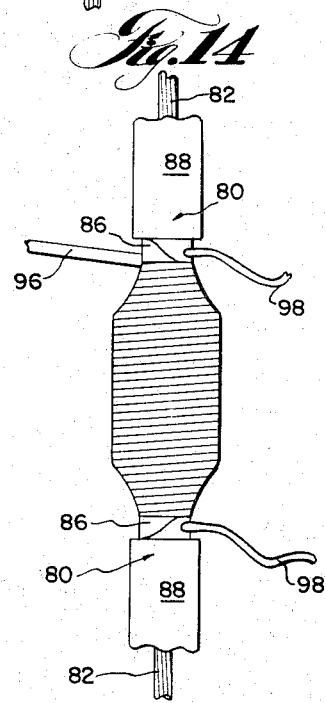
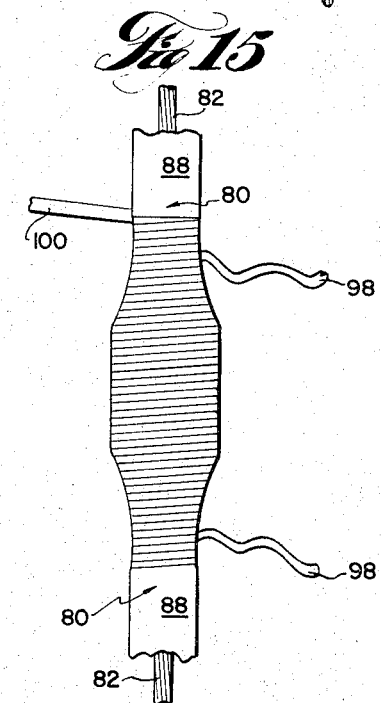
INVENTORS
THOMAS W. CALLAHAN
EDWARD K. DUFFY
ATTORNEY 3,356,788
STRESS RELIEF CONES FOR HIGH VOLTAGE, SHIELDED CONDUCTORS
Thomas W. Callahan, Massena, and Edward K. Duffy, Rome, N.Y., assignors to Aluminum Company of America, Pittsburgh, Pa., a corporation of Pennsylvania
Filed Nov. 19, 1963, Ser. No. 324,783
4 Claims. (Cl. 174—73)

This invention relates generally to insulated electric cables and conductors. It is more specifically addressed to high voltage insulated conductors incorporating conductive ground potential shielding overlying the insulation thereof and the provision of novel and improved practices, techniques and components for controlling dielectric stresses adjacent splices and terminals in such high voltage, ground shielded, insulated cables and conductors to avoid electrically induced stress failures in the insulation of energized installations of the same.

It is conventional practice to employ conductive electrostatic ground shielding in overlying relationship on the manufactured or factory applied insulation layer of high voltage cables and conductors to control dielectric stresses generated within and on the surface of the manufactured insulation layer in energized installations of such shielded insulated cables and conductors. This conventional practice insures longer life for the insulating materials, as well as providing an increased measure of safety to personnel and/or animal life exposed to external contact with energized installations of such conductors and cables. As will be fully understood by those skilled in the art to which the present invention is addressed, the electrically grounded conductive shielding acts and serves to provide an equipotential surface electrode confining the generated dielectric fields radially within the insulation, while maintaining a zero voltage potential gradient in a longitudinal direction on the surface of the insulation remote to the conductor under 100 percent potential loading. High voltage or high potential cables and conductors, as herein employed, are normally rated at 3 kv. and above, and are particularly and practically popular within the rated range of 5 kv. to 35 kv. capacity in both aerial and underground installations of the same.

Installations incorporating conductive ground shielded insulated conductors and cables of the type herein under discussion invariably require terminations or terminal connections at one or both ends of such conductors and cables, as in the case of connections to transformers or the like, as well as splice connections between the ends of adjacent similar capacity cables or conductors in straight or otherwise continuous runs of the same. Conventional practice in either respect requires that the electrically conductive ground shielding of a cable or conductor must be cut-back or removed from the terminal end or ends of each conductor a predetermined distance to prevent electrical breakdown of the adjacent air, which removal operation exposes the manufactured insulation supported on the central metallic conductor in each instance. The cut-back distance of the shielding, or exposed length of manufactured insulation, is known for any given size and capacity of conductively ground shielded cable to prevent the aforesaid electrical breakdown or flashover of the atmosphere from the high potential end of the conductor to the shielding at ground potential at its cut-back terminus or edge, as well as to prevent creepage along the surface of the exposed manufactured insulation between these two points. Needless to say, excessive potential gradients are generated and prevail on the surface of the insulation in the areas adjacent abrupt cut-back termination of the electrically conductive shielding in such energized cables and conductors and the intensities of these excessive potential gradients can be such that the dielectric insulation can and normally is punctured in these areas.

Electrical analysis of energized high potential, ground shielded, insulated cables and conductors has clearly established that the flux lines responsible for distribution of dielectric stress are substantially uniformly radial within the conductor or cable coextensive with the conductive shielding. However, beyond the cut-back shielding in the direction axially along the exposed manufactured insulation, the flux lines are diverted towards the shielding and are productive of high electrical stresses coupled with low dielectric puncture values of the unshielded manufactured insulation. In this connection, accurately conducted laboratory testing of commercially approved high voltage conductively shielded polyethylene insulated cables, having a guaranteed dielectric breakdown value of the order of 100 kv., have repeatedly shown failure of their exposed manufactured insulation in the areas of abruptly terminated ground shielding at values as low as 60 kv., thus representing a 40 percent loss in the guaranteed dielectric strength of the exposed original insulation.

Conventionally, and in relief of the complained of dielectric failures, it has been a recognized and accepted practice to apply additional dielectric insulation adjacent and contiguously away from the abruptly terminated conductive shielding in overlying relationship on the exposed original or manufactured insulation of commercially approved high voltage conductively shielded cables or conductors by helically wrapping uniform width insulating tape thereon in sufficient layers of the same to provide a stress relief cone configuration sloping axially outwardly from the conductive shielding to some maximum cone diameter normal to the axis of the conductor, the angular slope or slopes of the so formed stress relief cone of added insulation material preferably following and conforming to an established double logarithmic curve based on a scientifically developed and derived formula to be hereinafter explained.

The above referred to stress relief cones are being regularly constructed in the field from conventional rolls of a wide variety of commercially approved uniform width dielectric insulating tapes, usually ¾" to 1" in width, the tapes being hand-wrapped back and forth along the exposed length of the original or factory applied insulation of a cable to be terminated, or the adjacent abutting ends of two similarly prepared cables in a splice therebetween, to provide as near as humanly possible the double stress relief cone configurations established and conforming to the aforesaid double logarithmic curve configurations. A final metallic or other electrically conductive conventional ground shielding material, such as metallic tinsel braid, metallic foil in tape form or other conductive tape, is thereafter conventionally applied on the outer surface of the built-up conical stress relief cone structure in electrical contact and circuitry with the permanent or unremoved original shielding of the conductor or conductors in the termination and/or splice, respectively, as will be more clearly explained hereinafter. Needless to say, such stress relief cone practices are completely dependent upon the skill of the operators or workmen performing the same.

The main object of the present invention is to provide prefabricated accurately configurated single or one-piece preformed insulation strips for application by convolute wrapping in overlapping overlying disposition on exposed original or manufactured insulation of cut-back conductively ground shielded insulated high voltage cables and conductors, the one-piece strips being characterized in their pre-calculated planar outline to provide scientifically developed and approved theoretically perfect stress relief cone configurations required at the terminations and splices in high voltage conductively ground shielded insulated cable installations.

Another object of the invention is to provide an accurately configured generally pennant-shaped single insulation strip for wrapping overlapping overlying built-up application on original or manufactured insulation of a conductively ground shielded insulated high voltage electric cable, the original insulation of which has been exposed by cutting-back the electrically conductive ground shielding to provide termination of the cable, and the pennant-shaped single insulation strip being predeterminately configured to provide a protective conical-shaped convolute wrapped stress relief cone configuration adjacent the cut-back shielding.

Other objects and advantages will be appreciated and understood by those skilled in the art to which the present invention is addressed on consideration of the following description and drawings, in which:

FIG. 1 represents a diagrammatic illustration, with descriptive legends, depicting a universally accepted built-up substantially theoretically perfect stress relief cone configuration for terminating an insulated conductively shielded high voltage cable or conductor;

FIG. 2 represents a view similar to FIG. 1, but illustrating a universally accepted substantially theoretically perfect symmetrical stress relief cone configuration for a splice between the adjacent ends of two similar insulated conductively shielded cables or conductors;

FIG. 3 represents a prefabricated one-piece configurated insulation strip or pennant adapted to be applied by convolute wrapping on exposed original or manufactured insulation adjacent to and contiguously away from a cutback or terminated electrically conductive shielding layer of an insulated conductively ground shielded high voltage conductor or cable to provide an accurate and electrically sound termination stress relief cone configuration for said conductor or cable;

FIG. 4 represents a prefabricated one-piece configurated insulation strip or pennant adapted to be applied by convolute wrapping on exposed original or manufactured insulation presented by two axially aligned electrically end-connected insulated conductively shielded high voltage conductors or cables in the area between their cutback or terminated shielding in the formation of a splice therebetween, to provide an accurately configured and electrically sound symmetrical stress relief cone for said splice;

FIGS. 5, 6, 7, 8 and 9 represent progressive steps performed in producing a substantially theoretically perfect stress relieved termination for a conductively ground shielded insulated high voltage cable or conductor in accordance with the invention;

FIG. 10 represents a partial longitudinal sectional view, to slightly enlarged scale, of the stress relieved termination illustrated in FIG. 7;

FIGS. 11, 12, 13, 14 and 15 represent progressive steps performed in producing a substantially theoretically perfect stress relieved splice between two similar conductively ground shieldeded insulated high voltage cables or conductors in accordance with the invention; and FIG. 16 represents a partial longitudinal sectional view to slightly enlarged scale, of the stress relieved splice illustrated in FIG. 13.

Referring now to the appended illustrations, FIGS. 1 and 2 diagrammatically illustrate insulated conductively ground shielded high voltage conductors in universally accepted, theoretically perfect, terminated and spliced installations thereof, respectively. In each instance a conventionally accepted theoretically perfect stress relief cone configuration has been employed at the termination (FIG. 1) and at the splice (FIG. 2) in accordance with the double logarithmic curve configuration conforming to the equation:

$$\log D = \frac{(k_t/k_i) \log_{10}(d_i/d_c)}{\frac{E}{gL} - 1} + \log_{10} d_i$$

where the letter symbols in the formula correspond to their counterparts shown in FIGS. 1 and 2 and are defined in terms of:

$D$ = diameter in inches of the stress cone at any distance L (inches) from the abruptly terminated original electrically conductive shielding supported on the manufactured insulation of the cable or conductor, $L$ = distance in inches from the aforesaid abruptly terminated original shielding to the transverse plane of diameter D, $g$ = potential gradient kv./inch axially along the surface of the cable or conductor, $d_i$ = diameter in inches of the original manufactured cable insulation, $d_c$ = diameter in inches of the conductor, $k_i$ = dielectric constant of the original manufactured cable insulation, $k_t$ = dielectric constant of the insulation used in the stress relief cone, $E$ = line voltage, kv., $Q = \log_{10} d_i$, $P = (k_t/k_i) \log_{10}(d_i/d_c)$, and $\log D =$ $$\log D = \frac{P}{\frac{E}{gL} - 1} + Q$$

Further reference to the appended illustrations will reveal that the double logarithmic log D curve, or slope of the termination stress relief cone configuration of FIG. 1, only applies to the lower portion of the double conical configuration illustrated therein, whereas the log D curve or slope is employed symmetrically in the stress relief cone configuration in the splice of FIG. 2.

Stress relief cone configurations of the general type illustrated in FIGS. 1 and 2, as earlier stated hereinabove, have been conventionally built-up in the field, as required, from uniform width commercially acceptable insulating tape and needless to say the stress relief cones thus obtained are of varying accuracy and rarely if ever approach the theoretically perfect configurations conforming to the above-explained theoretically perfect double logarithmic curve formula.

In comparison thereto, and distinguishing from the conventionally accepted practices employed to obtain the theoretically perfect stress relief cones of FIGS. 1 and 2, the present invention provides a single or one-piece length or strip of prefabricated uniform thickness insulating tape of predetermined dimensional accuracy and outline, which is adapted, when wrapped convolutely in overlapping layers around the manufactured cable insulation of a high voltage conductively shielded cable or conductor, the manufactured insulation having been exposed by axial removal of the conductive ground shielding carried thereby, to automatically provide the theoretically perfect stress relief cone configurations such as depicted in FIGS. 1 and 2.

For example, in FIG. 3 there is illustrated a one-piece terminating strip or pennant of uniform thickness insulating material prefabricated from a length of approved electrical insulating tape to a predetermined planar configuration, which on convolute wrapped application around the exposed manufactured insulation of a correctly prepared conductive ground shielded conductor or cable, will provide a termination stress relief conical configuration substantially conforming to the theoretically perfect termination stress relief cone, such as depicted in FIG. 1. It will be observed in this connection that the prefabricated pennant or single strip tape 10 of FIG. 3 is defined in its outline by a major marginal straight edge 12 and an opposite major marginal curvilinear edge 14, which latter edge, under the practice of the invention, is a predetermined exponential function of substantially the double logarithmic curve of the theoretically perfect termination stress relief cone in accordance with FIG. 1 and established by the aforesaid formula:

$$\log D = \frac{(k_t/k_i) \log_{10} (d_i/d_o)}{\frac{E}{gL} - 1} + \log_{10} d_i$$

A tab extension 16 is substantially centrally located adjacent the widest width or leading edge of the tape 10 and is preferably curvilinearly and smoothly blended in contiguous edge or border outline attachment at 18 and 20 to the opposite major marginal edges 12 and 14, respectively, of the configurated pennant or tape. The narrower trailing end or terminus of the pennant 10 is slightly blunt at 22, as determined by the tapering approach or convergence of the major marginal edges 12 and 14 for the particular size and capacity of cable to be terminated.

In regard to the exponential trace of the major marginal edge 14 of the one-piece tape or pennant 10, it will be observed that increments along the contiguous length thereof, between the points A and B, decreasingly vary in their distances measured normally to the opposite major marginal straight edge 12 in conformance to the mathematically developed exponential function of the substantially theoretically perfect stress relief cone configuration defined by:

$$\log D = \frac{(k_t/k_i) \log_{10} (d_i/d_o)}{\frac{E}{gL} - 1} + \log_{10} d_i$$

for a particular conductor or cable to be terminated.

A guide line 24 is printed or otherwise visually inscribed, preferably inwardly from and along the major marginal straight edge 12. However, and if desired, the aforesaid visual guide line 24 may be provided along the opposite edge 14, or along both major marginal edges 12 and 14 of the one-piece pennant 10, the purpose of which will be explained in detail hereinafter.

FIG. 4 is illustrative of a one-piece splice tape or pennant 30 of uniform thickness approved and accepted insulating material prefabricated in its planar configuration or outline to provide the theoretically perfect stress relief cone configuration for a splice, such as illustrated in FIG. 2, following convolute wrapped application of the same to fill the void between correctly prepared, end-connected conductors, as well as adjacent and over the exposed manufactured insulation of two similar conductively ground shielded insulated high voltage conductors or cables comprising the splice.

In this particular adaptation of the invention, the splicing tape or pennant 30 is substantially symmetrical in respect to its longitudinal medial axis to thereby provide substantially duplicate oppositely disposed exponential curvilinear major marginal edge traces 32 and 34, or C–D and E–F, each substantially identical to the curvilinear trace 14, or A–B, of the terminating pennant 10 for a splice between conductors of the same general type and voltage capacity for which the terminating pennant 10 had been prefabricated. The splice pennant 30 is also of necessity wider in its maximum transverse width plane C–E (FIG. 4) to that of the widest transverse width of the terminating pennant 10 through its marginal edge point identified at A (FIG. 3) thereof and is oppositely generally convergingly tapered from its maximum width in the plane C–E to its leading edge or end 36 and trailing edge or end 40.

It will also be observed that the splice pennant 30 is defined along its opposite marginal edge from its maximum transverse width plane C–E to its leading edge 36, which is suitably notched at 38 to receive a connector for the conductors to be coupled or end-connected, by marginal edge traces which are compound in nature in that they comprise relatively sharply curved elements of marginal length 31 and 33 in contiguously smoothly blended tangential connection to generally straight tapered marginal elements of length 37 and 39, respectively, the definitive structural configuration differences between the terminating pennant 10 of FIG. 3 and splice pennant 30 of FIG. 4 being hereinafter described in more detail.

A guide line 42 is printed or otherwise visually inscribed inwardly from and along one or both of the oppositely disposed length-defining edges of the splice pennant 30 of FIG. 4.

On reference to FIGS. 5 through 9, successive steps have been illustrated in applying a prefabricated one-piece terminating pennant, such as the pennant 10 of FIG. 3, to provide a theoretically perfect termination stress relief cone in accordance with the teaching and practice of the invention. In this regard, a conventional high voltage conductive ground shielded conductor or cable 50, having a central metallic conductor 52, original or manufactured insulation layer 54, an intermediate electrically conductive ground shield, such as a metallic tape 56, and an outer or exposed insulating surface layer or jacket 58, is illustrated as having the terminal end of its conductor 52 conventionally attached or connected to a terminal post 60, such as a transformer block. In such a practical installation and practice of the invention, the high voltage ground shielded insulated cable selected for purposes of describing and testing the invention is illustrated in FIGS. 5 through 9 and 10 as a widely used conventional high voltage ground shielded polyethylene insulated conductor. However, the invention has been employed, and lends itself, to other available conventional types of conductive ground shielded insulated high voltage cables, with FIGS. 1 and 2 being illustrative of a well-known and widely accepted cable or conductor with which the invention has also been successfully employed.

The successive steps in terminating cables and conductors with which the invention has been successfully employed, one embodiment of which is illustrated in FIGS. 5 through 9 and 10, comprised removing or stripping the outer insulating sheath or jacket 58, the intermediate conductive ground shielding tape 56 and insulation sheath 54, as well as any other layers or additional manufacturing tapes customarily employed between the above-stated successive layers of conventional build-up conductive ground shielded and insulated high voltage conductor or cable, for an axial distance from the terminal end thereof to expose the central conductor 52 over a terminal end minimum length at least equal to the axial depth of the bore in the terminal post 60, and preferably approximately twice the length of the aforesaid axial bore depth, in order to permit electrical connection and termination with the aforesaid post 60.

The outer insulating jacket 58 and electrically conductive shielding 56 were also further removed or stripped to expose the manufactured or factory applied insulation 54 over an axial distance or length, measured from the exposed end of the conductor 50, recognized as correct and proper in prior conventional cable or conductor terminating practices, which axial distances are regularly stipulated by the manufacturers of ground shielded insulated high voltage cables and conductors in terms of the rated voltage and dielectric characteristics of the insulation employed in the manufacture of the specific conductor or cable to be terminated. It is to be observed in this regard that the outer insulating sheath 58 has been axially removed a short distance beyond the intermediate conductive ground shielding layer 56 and that it is also conventional terminating practice to pencil or taper the end of the factory applied or manufactured insulation 54, as at 62.

For purposes of description only, the terminating pennant 10 was prefabricated from a commercially available and approved conventional self-fusing type uniform thickness rubber base insulating material provided with a peelable holland cloth backing layer 64 on its under normally tacky surface opposite to that bearing the visual guide line or lines 24. Otherwise, the axial length and maximum breadth of the terminating pennant 10 was established to satisfy the exponential trace of its major marginal edge 14 to insure the theoretically perfect stress relief cone for the rated voltage and dimensional values of the cable or conductor to be terminated by convolute wrapping of the pennant 10 on the exposed insulation 54 in FIGS. 5 through 9 and 10, all in accordance with the dimensional and electrical parameters to be satisfied in terminating a particular selected conductive ground shielded high voltage insulated conductor or cable.

The peelable holland cloth backing 64 was partially removed from the pennant 10 for some workable distance from the leading end tab 16 to expose its adhesively tacky surface, and the thus exposed surface of the pennant was applied and pressed against the manufactured cable insulation 54 remote to the ground shielding 56 a sufficient axial distance therefrom to avoid lapping the same. It will be observed on reference to FIG. 5 that the terminating pennant 10, at the start of its convolute adhesively wrapped application on the exposed surface of the original or manufactured cable insulation 54, presents the guide line 24 visually and outwardly directed and with the exponential marginal edge 14 thereof adjacent the terminated conductive ground shielding layer 56.

On reference to FIG. 6, it will be further observed that subsequent convolute wraps of the pennant 10 involve substantial registration of the major marginal straight edge 12 with the visually exposed guide line 24 during application of the pennant 10, the completely applied pennant being shown in FIG. 7 with its narrowest trailing end 22 outermost. Only sufficient tension is required in applying the prefabricated pennant 10 to insure conformance of and self-bonding of the overlying layers thereof without wrinkling, the backing 64 being removed as wrapping progresses. The guide line 24 insures exponential build-up of the applied insulation along its curvilinear edge 14, as a result of the dimensionally predetermined configuration of the prefabricated pennant 10, in substantial conformity to the theoretically perfect double logarithmic stress relief termination cone, as in FIG. 1.

Substantial and effective completion of the substantially theoretically perfect termination stress relief cone was accomplished by helically wrapping one or more half-lapped overlying layers or servings of conventional electrically conductive shielding tape 68 from electrical contact with the original conductive ground shielding layer 56 axially outwardly to substantially the maximum diameter of the termination cone configuration (FIG. 8), a ground wire 7 having been suitably secured, as by soldering or the like, to the earlier exposed conductive ground shielding layer 56. Manifestly, the serving or servings of electrically conductive shielding tape 68 could be applied in opposite axial direction to that illustrated in FIG. 8. If desired and preferably, a final protective covering, preferably two half-lapped layers of conventional adhesive-backed wear-resistant insulating polyvinyl tape 72, can be applied over the otherwise exposed surface of the double conical termination stress relief cone configuration (FIG. 9). A weather-resistant paint may also be applied in one or more coats over the tape 72.

The relative relationship existing between the successive convolute wraps of the terminating pennant 10 of the invention, above described and illustrated in FIGS. 5 through 9, will be more clearly appreciated on inspection of the slightly enlarged and exaggerated sectional view disclosed in FIG. 10, where similar reference numerals have been applied to identify the component parts thereof. In this regard, the successive stepped ledges produced by the exponential trace of the major marginal edge 14 of the wrapped pennant 10 result in producing the desired substantially theoretically perfect double logarithmic terminating stress relief cone above referred to.

FIGS. 11 through 15 and 16 illustrate successive steps in applying and obtaining a substantially theoretically perfect splice stress relief cone configuration employing the exponentially configurated prefabricated splice tape or pennant 30 of FIG. 4.

In a splicing operation performed in accordance with the invention, two similar polyethylene insulated conductively ground shielded high voltage cables 80, each having a central metallic conductor 82, original or manufactured polyethylene insulation layer 84, an intermediate electrically conductive ground shield, such as a metallic tape 86, and an outer or exposed polyethylene insulating surface layer or jacket 88, are illustrated as having their axially aligned ends stripped down to their bare central condutcor 82 to expose an axial length suitable for conventional electrical and static coupling by means of a conventional metallic connector 90. The aligned cables or condutcors 80 are also each stripped of their outer insulating jacket 88 and intermediate conductive shielding 86, as well as any other layers or additional manufacturing tapes customarily employed between the above-stated successive layers of conventional built-up conductive ground shielded and insulated high voltage conductor or cable, for an axial distance on either side of the connector 90 to expose the manufactured insulation layer 84, as well as a relatively short axial length of the intermediate conductive ground shielding tape 86 supported thereon, in dimensionally recognized and accepted axial length relationship for conductively ground shielded high voltage insulated cables and condutcors undergoing splicing, and as stipulated by the manufacturers of such conductors or cables in terms of the rated voltage and dielectric characteristics of the insulation employed in the manufacture of the same. In this regard, it will also be observed that it is conventional practice to pencil or taper the end of the factory applied or manufactured insulation 84, as at 92.

With the coupled or electrically connected cables 80 thus prepared, the single or one-piece splice pennant, such as the uniform thickness tape 30 of FIG. 4, preferably prefabricated from the same commercially available and approved self-fusing synthetic rubber base insulating material employed for the terminating pennant 10, and provided with a peelable holland cloth backing 94 on its underside normally tacky surface opposite to that bearing the marginal guide lines 42 (FIG. 4), was selected to complete the splice in accordance with the practice of the invention.

The peelable backing 94 was first partially removed from the splice pennant 30 for a workable distance axially from the uniformly tapered leading end 36 thereof to expose its adhesively tacky under surface. The thus exposed tacky surface of the pennant 30 was then applied against the exposed conductors 82 in position to locate the compression connector sleeve 90 within the end recess 38 of the splice pennant and convolute wrapping of the same initiated to first fill in the void defined between the pencil tapered manufactured conductor insulation 84 radially outwardly from the metallic conductors 82 to the outer full diameter of the insulation 84. It is significant at this point to appreciate the fact that the uniformly tapered and increasing width of the pennant 30 extending in the longitudinal direction away from the recessed end 38, and defined between the straight tapered marginal edge traces 37 and 39 thereof, was dimensionally predetermined to substantially conform to and fill up the diverging recess defined between the pencil tapered shoulders 92 of the insulation and radially outwardly from the conductors 82 into the plane of the outer uniform diameter of the manufactured insulation 84 carried by the similar conductors 82.

Continued convolute wrapping of the prefabricated splice pennant 30 resulted in disposing the axial length thereof defined between the sharp curvilinear marginal edges 31 and 33 up to the maximum width C–E thereof, as well as beyond the aforesaid maximum width plane C–E to the trailing end 40 thereof, in overlying plys conforming to the aforementioned symmetrical substantially theoretically perfect double logarithmic stress relief cone configuration radially beyond the manufactured insulation 84, as earlier described and defined in terms of FIG. 2 by the formula:

$$\log D = \frac{(k_t/k_i) \log_{10}(d_i/d_o)}{\frac{E}{gL} - 1} + \log_{10} d_i$$

As in the case of the previously described termination stress relief cone, progressive convolute wrapping of the splice pennant 30 involved substantial registration of the major longitudinal marginal edges thereof with the visually outwardly directed guide lines 42 in successive convolute wraps or layers of the pennant, with just sufficient tension being applied during application of the pennant 30 to prevent wrinkling and insure self-bonding adhesion between the overlying layers thereof.

Further reference to FIGS. 12 and 13 will show that successive convolute turns or laps of the one-piece splice pennant 30 have produced opposite directional leads for the opposite exponential marginal edges 32 and 34 thereof, the opposite directionally sloped conical surfaces of the built-up pennant 30 being symmetrical and conforming to the substantially theoretically perfect double logarithmic stress relief splice cone described earlier herein in conjunction with FIG. 2.

Substantial and effective completion of the substantially theoretically perfect symmetrical stress relief splice cone configuration entailed one or more helically wrapped one half-lapped servings or layers of conventional electrically conductive shielding tape 96 over the entire axial length outer surface of the symmetrical stress relief cone splice in terminal electrical contact with the original manufactured shielding 86 (FIG. 14), a ground wire 98 having been suitably secured, as by soldering or the like, to the conductive ground shielding 86 of each of the conductors 82. If desired and preferably, a final protective covering, preferably two half-lapped layers or servings of conventional adhesive-backed weather-resistant insulating polyvinyl tape 100, can be helically wrapped over the otherwise exposed surface of the shielding tape 96. A weather-resistant paint may also be applied in one or more coats over the tape 100.

The relative relationship existing between the successive convolute layers or wraps of the splice pennant 30 of the invention, above described and illustrated in FIGS. 11 through 15 will be more clearly appreciated on inspection of the slightly enlarged and exaggerated sectional view disclosed in FIG. 16, where similar reference numerals have been employed in all of FIGS. 11 through 16 to identify identical features and elements. In this regard, the successive stepped ledges produced by the similar exponential traces of the opposite major marginal edge portions 32 and 34 of the wrapped splice pennant 30 result in the substantially perfect double logarithmic splice stress relief cone configuration above referred to.

Practice of the invention as hereinabove described is not to be taken as limiting the scope or intent thereof in respect of the particularly selected conventional conductors or cables and the materials employed in their manufacture. Nor is the self-fusing material of the terminating and splice pennants, 10 and 30 respectively, a limiting factor in the practice of the invention, since other adhesively precoated insulating materials are commercially available for this purpose. It is also possible to employ uncoated insulating materials with simultaneous application of compatible and readily available adhesives during convolute wrapping of the terminal and splice pennants 10 and 30. Commercially available glass fabric, and epoxy resin or equivalent commercially available adhesives applied at and between each convolute wrap thereof, have also proved to be highly satisfactory insulation materials and adhesives for the pennants providing the terminal and splice stress relief cone configurations of the invention.

It will be appreciated in regard to the descriptions of the applications of the terminal pennant 10 and splice pennant 30, above described, that the ground wire 70 of FIGS. 8 and 9 would be electrically connected to ground potential, and that both of the ground wires 98 of FIGS. 14 and 15 would also be electrically connected together across the splice in conventional ground potential circuitry.

The one-piece exponentially characterized and designed stress relief pennants 10 and 30, as well as the guided full width successive layer convolute wrapping of the same in the production of the substantially theoretically perfect terminating and splice stress relief cone configurations of the invention, as hereinabove described, have been responsible for eliminating the existence of objectionable and complained of air voids prevalent in prior art stress relief cone configurations built-up from uniform width insulating tapes, which latter tapes have, by their very nature, given rise to unguided and faulty marginal edge registration and non-uniform overlaps in successive wrapped layers of the same, whereby greater radial electrical strength obtains for the compact one-piece pennant-produced stress relief cone configurations of the invention than has been observed or recorded for the prior art uniform width insulating tape stress relief cone configurations.

Having hereinabove described the principles of structure and operation of the invention in general and in specific terms, what is claimed is:

1. A prefabricated one-piece tapered pennant-shaped strip of insulating material for contiguous overlying insulative contacting convolute wrapping from a leading to a trailing end thereof on exposed insulation of a high voltage conductive ground shielded cable adjacent the terminated shielding thereof and axially away therefrom towards a terminal end of the cable to provide a substantially theoretically perfect radially built-up stress relief cone against breakdown potential between the exposed insulation and shielding, said one-piece pennant-shaped strip, in planar disposition, having a maximum transverse width axially between lesser transverse width leading and trailing ends thereof contiguously connected on each opposite side of a longitudinal axis of the strip by a smoothly blended oppositely converging contiguous major marginal edge trace, that portion of the contiguous length of one of the opposite major marginal edge traces of the strip connecting the trailing end with the maximum transverse width thereof, on the side of the longitudinal axis adjacent the cable shielding on convolute wrapping of the strip on the exposed insulation of the cable, conforming to the exponential function of the double logarithmic curve of the theoretically perfect stress relief cone established for the rated voltage capacity of the cable, and said strip having a guide line inwardly disposed from and extending along at least one major marginal edge trace thereof for visual guiding convolute substantial registration of the same marginal edge in successive overlying wraps of the strip.

2. The prefabricated one-piece tapered pennant-shaped strip of insulating material according to claim 1 in which the insulating material is self-fusing under applied convolute wrapping of the same.

3. A prefabricated one-piece elongate tapered pennant-shaped strip of insulating material for contiguous overlying insulative contacting convolute wrapping from a leading to a trailing end thereof on exposed insulation of a high voltage conductive ground shielded cable adjacent the terminated shielding thereof and axially away therefrom towards a terminal end of the cable to provide a substantially theoretically perfect radially built-up stress relief termination cone for the cable against break-down potential between the exposed insulation and conductive ground shielding carried thereon, said one-piece strip, in planar disposition thereof, having a maximum transverse width disposed between axially separated lesser transverse width leading and trailing ends with the maximum transverse width closer to the leading end and remote from the trailing end of the strip, opposite major contiguous marginal edges of the strip connecting the trailing and leading ends thereof one each on opposite sides of a longitudinal axis of the strip, a contiguous length of one of the major marginal edges from the trailing edge to the maximum transverse width of the strip being a substantially straight line, the opposite major marginal edge over substantially the same axial length thereof, on the side of the longitudinal axis of the strip adjacent the cable shielding on convolute wrapping of the strip on the exposed insulation of the cable, substantially conforming to the exponential function of the double logarithmic curve definitive of the exterior slope of the theoretically perfect termination stress relief cone configuration of the convolutely wrapped strip for a cable of selected rated capacity, and said strip having a visual guide line inwardly disposed from and along at least a major portion of the length of one of its marginal edges for registration substantially with the same marginal edge thereof in successive convolute wraps of the strip.

4. A prefabricated one-piece elongate generally pennant-shaped strip of insulating material for contiguous overlying contacting convolute wrapping from a leading to a trailing end thereof on exposed insulation of two similar high potential conductive ground shielded cables adjacent their electrically axially connected ends to provide a substantially theoretically perfect radially built-up stress relief splice cone for the connected cables against break-down potential failure between the exposed insulation and conductive shielding of the cables, said one-piece strip of insulating material, in planar disposition, being substantially symmetrical about a medial longitudinal axis thereof and having a maximum transverse width axially located intermediate lesser transverse width opposite trailing and leading ends thereof, an axially opposite converging contiguous major marginal edge trace connecting the trailing and leading ends of the strip on each side of the medial longitudinal axis thereof, that contiguous portion of each opposite marginal edge trace connecting the trailing end of the strip and maximum transverse width thereof substantially conforming to the exponential function of the double logarithmic curve of the theoretically perfect stress relief splice cone established for the rated voltage capacity of the cables in an electrical axial end connection thereof, and said strip having a visual guide line inwardly disposed from and along at least a major portion of the length of one of its opposite marginal edge traces for registration substantially with the same marginal edge trace thereof in successive convolute wraps of the strip.

References Cited

UNITED STATES PATENTS

| | | | |
|---|---|---|---|
| 1,217,890 | 2/1917 | Fortescue | 174—143 |
| 1,372,428 | 3/1921 | Hardy | 156—187 X |
| 1,642,514 | 9/1927 | Simons | 174—84 |
| 1,776,127 | 9/1930 | Miller | 174—84 |
| 1,955,305 | 4/1934 | Maslin | 174—143 |
| 2,401,996 | 12/1946 | Wetherill | 174—73 X |
| 3,141,060 | 7/1964 | Norton | 174—73 |

FOREIGN PATENTS

| | | |
|---|---|---|
| 612,059 | 11/1948 | Great Britain. |
| 372,063 | 5/1952 | Great Britain. |

OTHER REFERENCES

Terminals and Joints for Insulated Power Cables—Electrical Design Considerations by L. F. Rochmann, AIEE (miscellaneous technical paper), December 1949 (pages 1–16 relied upon).

Rome Cable Division of Alcoa advertisement, Electrical World, vol. 159, No. 16, April 22, 1963, page 43.

LARAMIE E. ASKIN, *Primary Examiner.*

JOHN F. BURNS, LEWIS H. MYERS, *Examiners.*

W. B. FREDRICKS, J. F. RUGGIERO,
*Assistant Examiners.*